(12) United States Patent
Mohanan et al.

(10) Patent No.: US 12,443,685 B2
(45) Date of Patent: Oct. 14, 2025

(54) BATCH APPROVAL FOR INTERACTION REQUESTS IN A COMPUTING ENVIRONMENT

(71) Applicant: Truist Bank, Charlotte, NC (US)

(72) Inventors: Murali Mohanan, Marietta, GA (US); Noel Ciminello, North Dartmouth, MA (US)

(73) Assignee: Truist Bank, Charlotte, NC (US)

( * ) Notice: Subject to any disclaimer, the term of this patent is extended or adjusted under 35 U.S.C. 154(b) by 278 days.

(21) Appl. No.: 18/096,834

(22) Filed: Jan. 13, 2023

(65) Prior Publication Data

US 2024/0241928 A1 Jul. 18, 2024

(51) Int. Cl.
*G06F 21/31* (2013.01)
(52) U.S. Cl.
CPC ..................... *G06F 21/31* (2013.01)
(58) Field of Classification Search
CPC ....................................................... G06F 21/31
See application file for complete search history.

(56) References Cited

U.S. PATENT DOCUMENTS

| | | | | |
|---|---|---|---|---|
| 11,579,955 B1 * | 2/2023 | Wilson | ................... | G06F 16/986 |
| 11,861,147 B1 * | 1/2024 | Mohanan | ............. | G06Q 20/401 |
| 12,153,781 B2 * | 11/2024 | Mohanan | ................ | G06Q 20/10 |
| 12,298,930 B2 * | 5/2025 | Mohanan | ................ | G06Q 40/02 |
| 2006/0131387 A1 * | 6/2006 | Hansen | .................. | G06Q 20/04 |
| | | | | 235/379 |
| 2020/0304489 A1 * | 9/2020 | Hodge | .................. | G06Q 20/382 |
| 2021/0051142 A1 * | 2/2021 | Cu Castro | ............... | G06F 9/452 |
| 2021/0182809 A1 * | 6/2021 | Sukhija | ................ | G06Q 20/326 |
| 2023/0153826 A1 * | 5/2023 | Srivastava | .......... | G06F 11/0745 |
| | | | | 707/703 |
| 2024/0070236 A1 * | 2/2024 | Cella | ..................... | G06Q 20/065 |
| 2024/0273045 A1 * | 8/2024 | Mohanan | ............... | G06Q 40/02 |

\* cited by examiner

*Primary Examiner* — Dhairya A Patel
(74) *Attorney, Agent, or Firm* — Kilpatrick Townsend & Stockton LLP; Michael A. Springs, Esq.

(57) ABSTRACT

Computing environments can perform batch approval of batch interaction requests according to some aspects described herein. For example, a processing device can receive a batch of interaction requests from one or more client devices. Prior to performing the requested interactions, the processing device can assign a validation identification number to each interaction request based on an identified validation process for that interaction request. The validation identification number can indicate that the identified validation process is to be performed for that interaction request. The processing device can also assign a batch identification number to each interaction request in the batch. In response, the processing device can automatically validate all interaction requests in the batch substantially contemporaneously using one or more validation processes associated with interactions in the batch.

18 Claims, 3 Drawing Sheets

BATCH APPROVAL FOR INTERACTION REQUESTS IN A COMPUTING ENVIRONMENT

TECHNICAL FIELD

The present disclosure relates generally to computing environments and, more particularly (although not necessarily exclusively), to batch approval for interaction requests in computing environments.

BACKGROUND

Computer environments can perform interactions between two or more computer systems. For instance, the interactions can involve data that is transmitted from a first computer system to a second computer system. In some cases, such interactions must be manually validated by a human before the interactions are performed to ensure secure data transmission or accuracy of the data. Manual validations of interactions can significantly increase an amount of time involved in performing the interactions.

DETAILED DESCRIPTION

Figure 1:
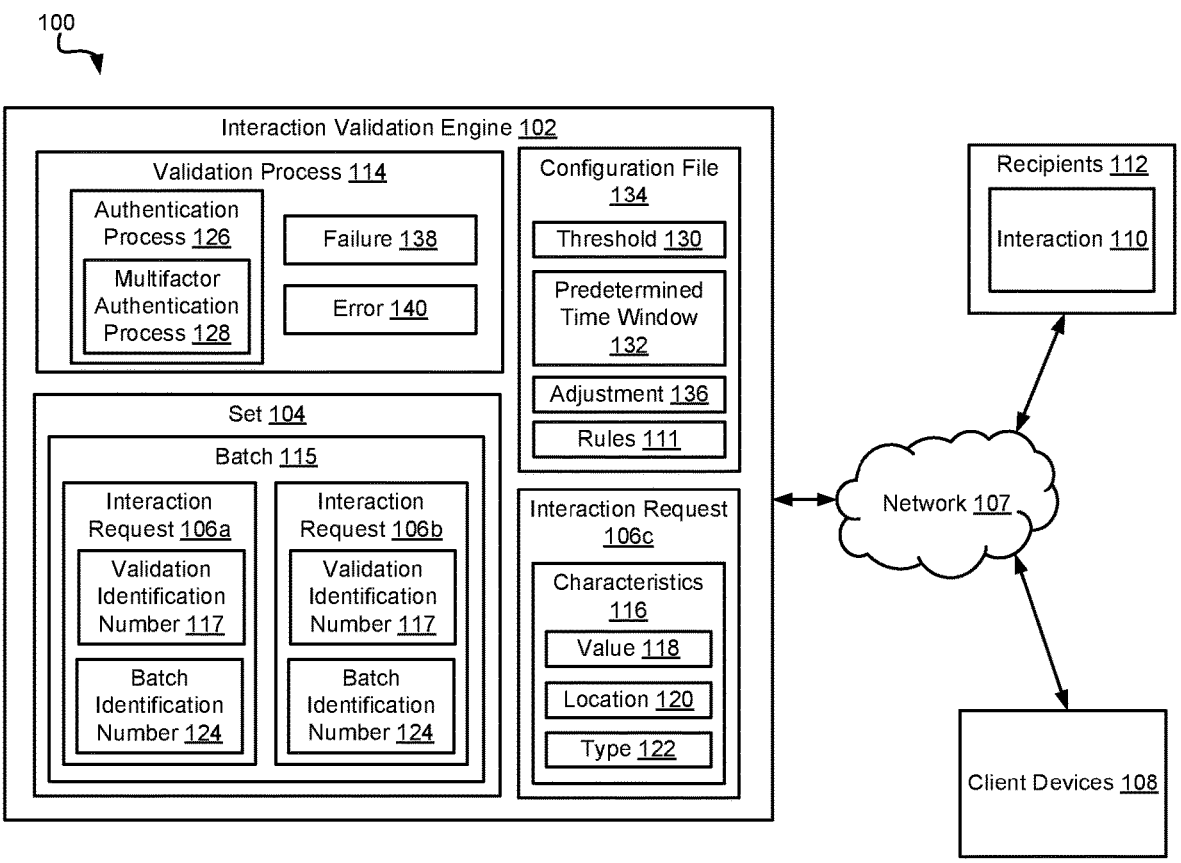
FIG. 1 is a block diagram of an example of a computing environment for performing batch approvals of interaction requests according to some examples of the present disclosure.

Computing environments that process interaction requests, such as wire transfer requests, may experience latency when validating large batches of interaction requests between computing systems. Entities, such as individuals or organizations associated with a first computing system, may submit large volumes of interaction requests for a second computing system at a time. Typically, each interaction request is validated individually, which may be time consuming for batches including dozens or hundreds of interaction requests. Individual validation processes may also be redundant, as some or all interaction requests received from a same source may have identical validation processes.

Some examples of the present disclosure overcome one or more of the abovementioned problems by using an interaction validation engine that can receive a batch of interaction requests and can perform a single, simultaneous (e.g., substantially contemporaneous) batch validation for the interaction requests. Performing a single validation process for multiple interaction requests at the same time may reduce latency in the computing environment compared to performing identical validation processes for individual interaction requests. Additionally, the interaction validation engine can attend to pending interaction requests. For example, the interaction approval engine may identify interaction requests that experienced interruptions during their validation process and prompt the source to resubmit the interaction requests. The validation processes for the interaction requests can also be easily customized by adjusting configuration files in the interaction validation engine. This can allow client devices to enable and disable certain validation processes in the interaction validation engine.

In one particular example, an interaction validation engine in a computing environment can receive a batch of interaction requests from one or more client devices. The batch of interaction requests can include requests to perform wire transfers from source devices to recipient devices. In some examples, the same validation process may be assigned to the interaction requests in the batch. The interaction validation engine can determine that the batch of interaction requests all have this same validation process. Rather than individually validating each interaction request in the batch sequentially, which can be time consuming and resource intensive, the interaction validation engine can perform a batch validation of the batch of interaction requests.

For example, the interaction validation engine can assign a batch identification number to each interaction request in the batch. The batch identification number can be associated with the validation process. If there are any interaction requests in the batch that require a different validation process, the interaction validation engine may assign a different batch identification number (or not assign any batch identification number) to those interaction requests. For example, a particular interaction request may be a wire transfer request to a recipient in a geographical region that requires a more extensive validation process than the majority of the interaction requests in the set. Thus, the different validation process for the particular interaction request may be performed separately from the batch validation. After the interaction validation engine has assigned the batch identification number to each interaction request in the batch, the interaction validation engine can automatically perform a batch validation for the batch of interaction requests that all have the same batch identification number. The batch validation can involve simultaneously validating all interaction requests with the batch identification number. If the batch of interaction requests are approved, the system can allow the corresponding interactions (such as the wire transfers) to be performed. If the batch of interaction requests are disapproved (e.g., rejected), the system can prevent the corresponding interactions from being completed.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for performing batch validations of interaction requests 106 according to some examples of the present disclosure. Each communication within the computing environment 100 may occur over one or more data networks 107, such as a public data network, a private data network, or some combination thereof. A data network may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN).

The computing environment 100 can include an interaction validation engine 102 that can receive a set 104 of interaction requests 106a-b from one or more client devices 108. The interaction requests 106a-b can request interactions 110 with one or more recipients 112. Examples of the client devices 108 and the recipients 112 can include desktop computers, servers, videogame consoles, mobile phones (e.g., cellular phones), PDAs, tablet computers, net books, laptop computers, hand-held specialized readers, and wearing devices such as smart watches.

The interaction validation engine 102 can receive and approve interaction requests 106 from the client devices 108. The client device 108 may be an individual or organization that can transmit sets 104 with relatively large numbers of interaction requests 106. For example, client devices 108 may transmit dozens or hundreds of interaction requests 106 to the interaction validation engine 102, which can group the interaction requests 106 together based on their corresponding validation processes and validate the interaction requests 106 in one or more batches 115. The interaction requests 106 in a set 104 may have the same or different validation processes. In other examples, the batch 115 may include interaction requests 106 received from a client device 108 at one time. To enable faster processing of the interaction requests 106, the interaction validation engine 102 can perform batch validations (e.g., approvals or disapprovals) of the interaction requests 106.

The interaction validation engine 102 can include rules 111 governing validation processes for interaction requests. The rules 111 can be used to determine which validation process 114 to apply to each interaction request 106. The interaction validation engine 102 can use the rules 111 to select an appropriate validation process for a given interaction request 106 based on one or more characteristics 116 of the interaction request 106. Some examples of characteristics 116 of an interaction request 106 can include one or more values 118 in the interaction request 106, a source of the interaction request 106, a destination for the interaction request 106, a geographical location 120 associated with the interaction request 106, or a type 122 of the interaction request 106, etc. For example, the interaction validation engine 102 may include a rule 111 dictating that an interaction request 106a requesting a wire transfer with a value 118 that exceeds a certain threshold must undergo a particular validation process. Other rules 111 may pair certain characteristics 116 to levels of validation. For example, certain types of interaction requests 106 involving international wire transfers may require higher levels of validation than interaction requests 106 involving domestic wire transfers.

Each validation process 114 can be associated with a validation identification number 117. The validation identification number 117 can indicate to the interaction validation engine 102 that the associated interaction request 106 is to be validated using a corresponding validation process 114. The interaction validation engine 102 can identify a validation process 114 for each interaction request 106 in the set 104, for example by applying the rules 111. In some examples, after identifying the validation processes 114, the interaction validation engine 102 can determine a batch 115 of interaction requests 106a-b that have a same validation process 114. For example, each interaction request 106 in the batch 115 may have the same validation identification number 117. Each interaction request 106a-b in the batch 115 can therefore be assigned a batch identification number 124. In other examples, the batch 115 can be a group of interaction requests 106a-b that are received at one time from a particular client device 108. The batch identification number 124 can be assigned to each interaction request 106a-b in the batch 115.

The interaction validation engine 102 can then validate all interaction requests 106a-b that have the batch identification number 124 using the validation process 114 associated with the validation identification number 117. All interaction requests 106a-b in the batch 115 can be validated substantially contemporaneously (e.g., simultaneously). If the set 104 includes interaction requests 106 not included in the batch 115, the interaction validation engine 102 can perform separate and individual validation processes based on their validation identification number 117.

In some examples, the interaction validation engine 102 can determine the validation process 114 for a given interaction request 106 based on an authentication process 126 required for that interaction request 106. For example, the interaction validation engine 102 can determine that an issuer of the interaction request 106 has already been authenticated using a multifactor authentication process 128. Because multifactor authentication is more secure, there may be a lower likelihood that the issuer of the interaction request 106 is a malicious actor exploiting a compromised account. So, the interaction validation engine 102 can assign a less rigorous validation process 114 to the interaction request 106. For example, the interaction validation engine 102 can assign an automated validation process to the interaction request 106, where the automated validation process does not require manual validation or intervention. In other examples where the authentication process 126 does not involve multifactor authentication, alternate steps may be taken to increase security. For example, if a batch 115 of interaction requests 106a-b have an authentication process 126 involving single factor authentication, the interaction validation engine 102 can assign them a validation process 114 that includes a manual validation stage.

Performing validation processes 114 that involve manual validation can occasionally result in pending interaction requests 106 when the manual validation is not immediately performed. Rather than allowing interaction requests 106 to stay pending indefinitely, the interaction validation engine 102 can cancel or adjust the validation process 114 for the interaction request 106. For example, the interaction validation engine 102 can receive an interaction request 106c from the client devices 108. The interaction validation engine 102 may determine a validation process 114 for the interaction request 106c based on one or more characteristics 116 of the interaction request 106c. The validation process 114 can include a manual validation stage. The interaction validation engine 102 can then automatically submit the interaction request 106c for manual validation. The interaction request 106c may be pending in an approval queue for an amount of time while waiting for the manual validation. The interaction validation engine 102 can determine that the interaction request 106c has been pending in the approval queue without completing the validation process 114 for an amount of time that exceeds a threshold 130, such as a day or a week. In response to determining that the threshold 130 has been exceeded, the interaction validation engine 102 can automatically adjust the validation process 114 for the interaction request 106c. The adjustment can be made based on the characteristics 116 of the interaction request 106c. For example, the interaction validation engine 102 may identify a rule 111 specifying that pending interaction requests 106 sent from particular client devices 108 should be automatically canceled if the pending time exceeds the threshold 130. Another rule 111 may specify that pending interaction requests 106 with values 118 under a certain threshold should be submitted for manual approval to a backup approval entity, if their time pending exceeds the threshold 130.

Interaction requests 106 may pend without completing validation processes 114 for additional reasons. For example, the computing environment 100 may experience a failure 138, such as a network failure or a hardware failure, which may interrupt normal functioning of the interaction validation engine 102. Interaction requests 106 that are being validated during the failure 138 may not be fully processed and may therefore be in a pending state. The interaction validation engine 102 may determine that a particular validation process 114 for the batch 115 of interaction requests 106a-b experienced the failure 138. In response, the interaction validation engine 102 can automatically cancel the validation process 114 for the batch 115 and prompt the client device 108 to re-submit the batch 115. This can prevent the batch 115 from remaining in a pending state indefinitely. For example, pending interaction requests 106 may remain in a queue until they are done being processed by their corresponding validation processes, at which point the interaction requests 106 can be removed from the queue. Using this technique, if a validation process is interrupted before it is complete, the corresponding interaction request 106 will remain in the queue and will subsequently be processed again by the interaction validation engine 102 (e.g., once the failure is resolved via resubmission). Additionally, the interaction validation engine 102 may also perform validation for the rest of the interaction requests 106 in the batch 115.

In some examples, the interaction validation engine 102 may detect an error 140 with the batch 115 of interaction requests 106a-b received from the client devices 108. For example, the interaction validation engine 102 may detect that the interaction requests 106a-b do not identify a recipient 112. The error 140 may prevent the interaction validation engine 102 from performing or completing a validation process 114. In response, the interaction validation engine 102 can transmit the error 140 to the client devices 108 to automatically request a corrected batch of interaction requests from the client devices 108. This can allow the client devices 108 to modify and submit a corrected batch of interaction requests. Since the interaction validation engine 102 may have already mostly processed those interaction requests 106a-b, the interaction validation engine 102 may only need to perform limited additional processing to account for the modifications, which can conserve computing resources as compared to fully analyzing an entirely new batch of interaction requests. For example, the interaction validation engine 102 may determine that the corrected batch of interaction requests resolves the error 140. Then, the interaction validation engine 102 can validate the corrected batch of interaction requests.

In some examples, the interaction validation engine 102 may receive the batch 115 of interaction requests 106a-b outside of a predetermined time window 132, such as from 8:00 in the morning until 5:00 in the evening each day. The predetermined time window 132 can be a limited time period in which the interaction validation engine 102 is allowed to perform validation processes 114 on interaction requests. The batch 115 of interaction requests 106 can therefore be held in a queue until the next day. The batch 115 may be queued so that the computing environment 100 can prioritize other types of computing jobs outside the predetermined time window 132. The predetermined time window 132 may be adjusted by adjusting a configuration file 134 for the interaction validation engine 102, rather than requiring changes to code for the interaction validation engine 102. This can allow the interaction validation engine 102 to be dynamically adjusted to accommodate requests with high priority.

Validation processes 114 for the interaction validation engine 102 can be adjusted in additional ways using the configuration file 134. For example, the configuration file 134 may include the rules 111, including a rule associated with the batch identification number 124. The interaction validation engine 102 may receive an adjustment 136 to the configuration file 134 that can disable a validation process 114 associated with the batch identification number 124. Thus, when an interaction request 106 is subsequently received that is associated with the validation process 114 represented by the batch identification number 124, the interaction validation engine 102 can automatically perform the interaction 110 requested by the interaction request 106. The interaction 110 can be performed without performing the validation process 114. The adjustment 136 may be received from a user of the client devices 108. In this way, the user can customize (e.g., disable or enable) validation processes 114 for certain interaction requests 106. Other administrators may also adjust the configuration file 134 as desired to customize the operation of the interaction validation engine 102.

Although FIG. 1 depicts a certain number and arrangement of components, this is for illustrative purposes and intended to be non-limiting. Other examples may include more components, fewer components, different components, or a different arrangement of the components shown in FIG. 1.

Figure 2:
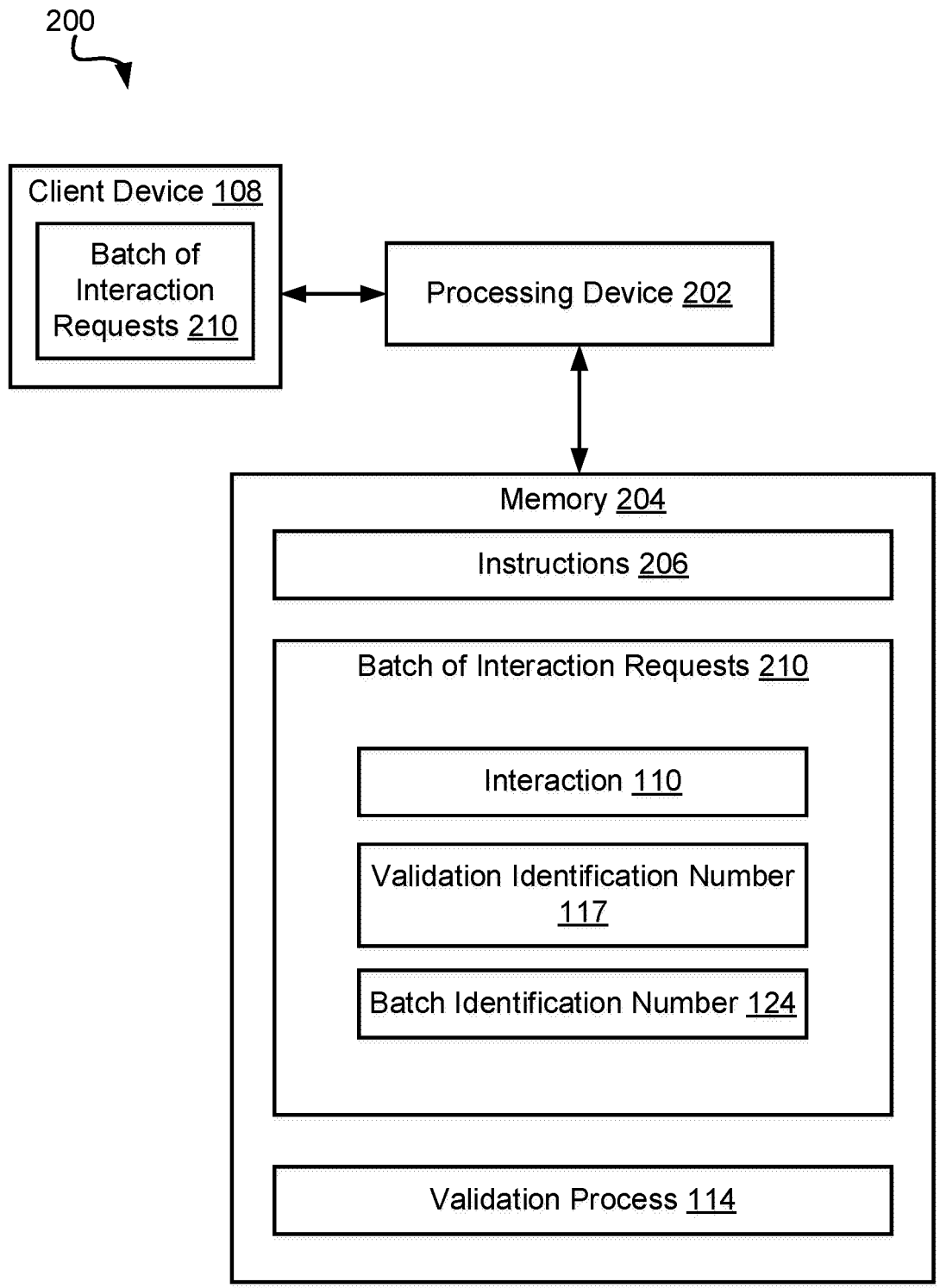
FIG. 2 is a block diagram of another example of a computing environment for performing batch approvals of interaction requests according to some examples of the present disclosure.

FIG. 2 is a block diagram of another example of a computing environment 200 for performing batch validations of interaction requests according to some examples of the present disclosure. The computing environment 200 depicted in FIG. 2 includes a processing device 202 communicatively coupled to a memory 204.

The processing device 202 can include one processor or multiple processors. Non-limiting examples of the processing device 202 include a Field-Programmable Gate Array (FPGA), an application-specific integrated circuit (ASIC), a microprocessor, etc. The processing device 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory can include a non-transitory computer-readable medium from which the processing device 202 can read instructions 206. A computer-readable medium can include electronic, optical, magnetic, or other storage devices capable of providing the processing device with computer-readable instructions or other program code. Examples of a computer-readable medium include magnetic disk(s), memory chip(s), ROM, RAM, an ASIC, a configured processor, optical storage, or any other non-transitory medium from which a computer processor can read the instructions 206.

In some examples, the processing device 202 can receive a batch of interaction requests 210 from one or more client devices 108. A validation process 114 can be performed before each requested interaction 110 is initiated or completed. Each interaction request in the batch of interaction requests 210 can be assigned a batch identification number 124 by the processing device 202. The batch identification number 124 can be associated with a validation process 114 to be performed simultaneously for all interaction requests in the batch of interaction requests 210. After assigning the batch identification number 124, the processing device 202 can perform a batch validation of multiple interaction requests, such as the batch of interaction requests 210. For example, the processing device 202 can automatically approve all interaction requests having the batch identification number 124 using the same validation process 114, including the batch of interaction requests 210.

Figure 3:
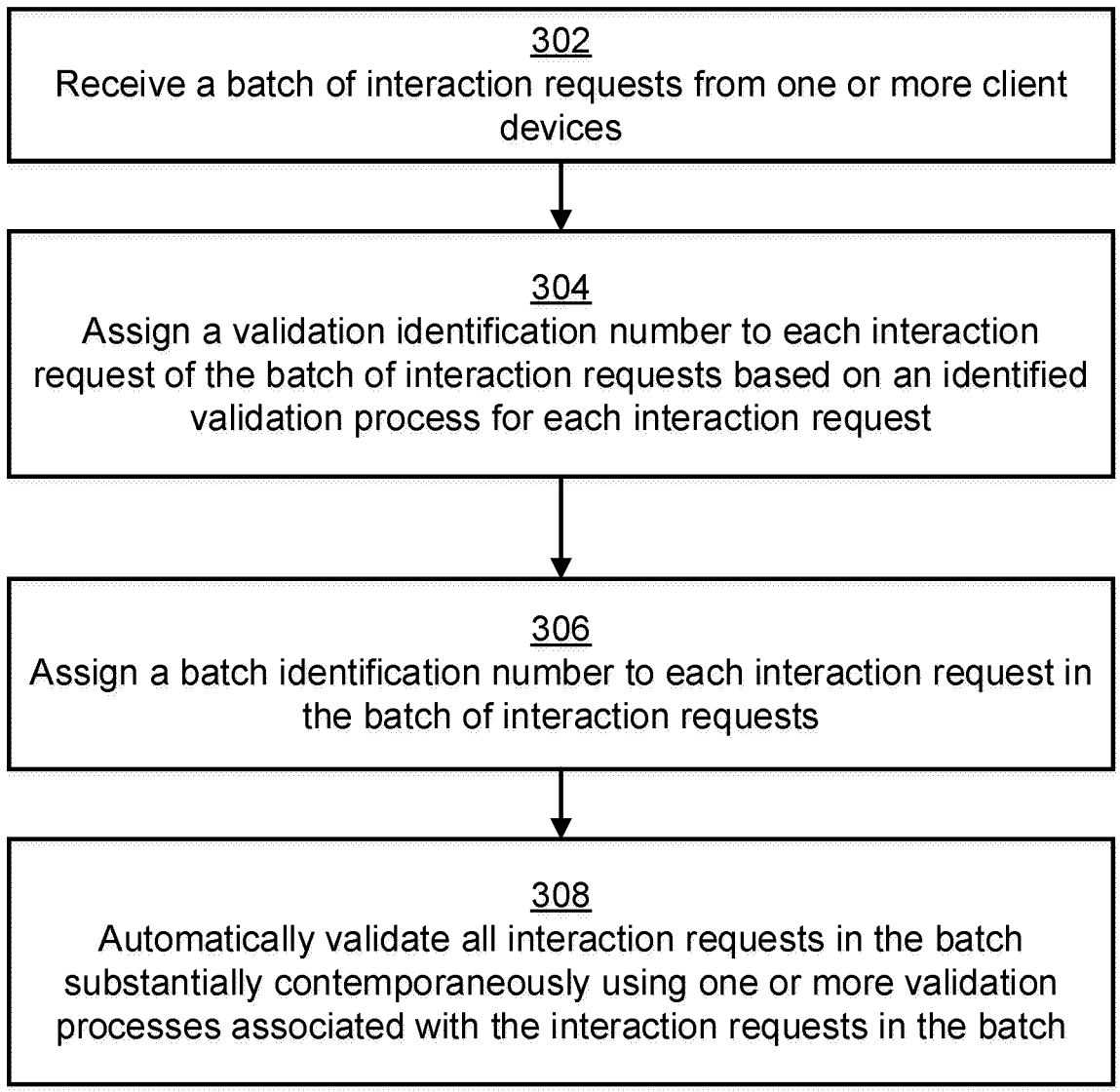
FIG. 3 is a flowchart of a process for performing batch approvals of interaction requests in a computing environment according to some examples of the present disclosure.

FIG. 3 is a flowchart of a process for performing batch validations of interaction requests 106 in a computing environment 200 according to some examples of the present disclosure. FIG. 3 is described with references to components in FIGS. 1-2. Other examples can include more steps, fewer steps, different steps, or a different order of the steps than is depicted in FIG. 3.

At block 302, the processing device 202 can receive a batch of interaction requests 210 from one or more client devices 108. The batch of interaction requests 210 may include a high volume of interaction requests 106, such as up to several hundred. The client devices 108 can be organizational entities transmitting interaction requests 106 that are wire transfer requests. For example, the interaction requests 106 can be associated with engaging in wire transfers between the client devices 108 and recipients 112. Each interaction request 106 can include a value 118 to wire transfer, an initiator of the wire transfer, and the recipient 112 of the wire transfer. Before interactions 110 for the batch of interaction requests 210 can be performed (e.g., before the wire transfers can be completed), the processing device 202 may approve or deny the interaction requests 106 in a validation process 114.

At block 304, the processing device 202 can assign a validation identification number 117 to each interaction request 106 of the batch of interaction requests 210 based on an identified validation process 114 for each interaction request 106. The processing device 202 can determine the validation process 114 based on stored rules 111 that map certain characteristics 116 of an interaction request 106 to certain validation processes 114. The rules 111 can also map the validation identification numbers 117 to certain validation processes 114. A validation identification number 117 can indicate that the identified validation process 114 for the associated interaction request 106 is to be performed for that interaction request 106.

At block 306, the processing device 202 can assign a batch identification number 124 to each interaction request 106 in the batch of interaction requests 210, for example in response to determining that the batch of interaction requests 210 has the same validation process 114 or based on other criteria such as the source of the batch 210. The batch identification number 124 can indicate that all interaction requests in the batch of interaction requests 210 should be validated at the same time.

At block 308, in response to assigning the batch identification number 124 to each interaction request 106 in the batch of interaction requests 210, the processing device 202 can automatically validate all interaction requests 106 in the batch of interaction requests 210 substantially contemporaneously using the one or more validation processes 114 associated with the interaction requests in the batch 210. For example, rather than individually and sequentially approving individual interaction requests 106, the processing device 202 can automatically perform a batch validation of the entire batch of interaction requests 210 simultaneously. After performing the batch validation, the batch of interaction requests 210 can then be processed to perform the interactions 110 (e.g., fulfill the wire transfers).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory comprising instructions that are executable by the processing device for causing the processing device to:
  receive a set of interaction requests from one or more client devices; and
  prior to performing interactions requested by the set of interaction requests:
    select a respective validation process, from among a plurality of predefined validation processes, to apply to each interaction request of the set of interaction requests;
    assign validation identification numbers to the interaction requests in the set, wherein a respective validation identification number is assigned to each interaction request of the set based on the respective validation process selected for that interaction request, the respective validation identification number uniquely identifying the respective validation process to be performed for that interaction request, and wherein at least two of the interaction requests in the set are assigned a same validation identification number associated with a same validation process of the plurality of predefined validation processes;
    divide the interaction requests into a plurality of batches by assigning a respective batch identification number to each interaction request in the set, wherein each interaction request is assigned to a respective batch of the plurality of batches based on the respective validation identification number assigned to the interaction request, such that each batch of the plurality of batches contains interaction requests having a shared validation identification number; and
    subsequent to dividing the interaction requests into the plurality of batches, automatically validate all interaction requests in a batch of the plurality of batches substantially contemporaneously using the respective validation process associated with the shared validation identification number corresponding to the batch;
  receive an interaction request from a client device;
  based on receiving the interaction request, assign a particular validation process to the interaction request;
  after assigning the particular validation process to the interaction request, initiate the particular validation process on the interaction request;
  after initiating the particular validation process on the interaction request, determine that the interaction request has been pending in an approval queue for longer than a threshold amount of time;

in response to determining that the interaction request has been pending in the approval queue for longer than the threshold amount of time, automatically adjust the particular validation process for the interaction request based on one or more characteristics of the interaction request; and execute the adjusted validation process, wherein the adjusted validation process involves at least one validation step that is different from the particular validation process.

2. The system of claim 1, wherein the memory further comprises instructions that are executable by the processing device for causing the processing device to: select the respective validation process for each interaction request in the set of interaction requests based on a respective authentication process associated with initiating the interaction request, wherein a more-rigorous validation process is selected when the respective authentication process is less rigorous, and wherein a less-rigorous validation process is selected when the respective authentication process is more rigorous.

3. The system of claim 2, wherein the memory further comprises instructions that are executable by the processing device for causing the processing device to:

determine that an authentication process associated with a particular interaction request of the set of interaction requests involves multifactor authentication; and select the less-rigorous validation process, from among the plurality of predefined validation processes, to apply to the interaction request based on the authentication process involving multifactor authentication.

4. The system of claim 3, wherein the memory further comprises instructions that are executable by the processing device for causing the processing device to:

determine that another authentication process associated with another interaction request in the set of interaction requests does not involve multifactor authentication; and select the more-rigorous validation process, from among the plurality of predefined validation processes, to apply to the other interaction request based on the other authentication process not involving multifactor authentication.

5. The system of claim 1, wherein the memory further comprises instructions that are executable by the processing device for causing the processing device to: select a validation process, from among the plurality of predefined validation processes, to apply to a particular interaction request of the set of interaction requests based on characteristics of the particular interaction request, the characteristics comprising a value of the particular interaction request, a geographical location associated with the particular interaction request, and a type of the particular interaction request.

6. The system of claim 1, wherein the memory further comprises instructions that are executable by the processing device for causing the processing device to:

receive an adjustment to a configuration file, the adjustment comprising disabling of a validation process for interaction requests associated with a particular batch identification number;

subsequent to the adjustment to the configuration file, receive another interaction request from a client device;

assign the particular batch identification number to the other interaction request; and in response to assigning the particular batch identification number to the other interaction request and based on the adjustment to the configuration file, automatically perform an interaction requested by the other interaction request without performing the validation process.

7. The system of claim 1, wherein the memory further comprises instructions that are executable by the processing device for causing the processing device to, subsequent to assigning the respective batch identification number to each interaction request:

determine, based on a configuration file, that the batch of interaction requests was received outside of a predetermined time window;

in response to determining that the batch of interaction requests was received after the predetermined time window, prevent the batch of interaction requests from being automatically validated until the predetermined time window occurs again by holding the batch of interaction requests in a queue; and adjust the configuration file to change the predetermined time window.

8. The system of claim 1, wherein the memory further comprises instructions that are executable by the processing device for causing the processing device to, prior to automatically validating the batch of interaction requests:

detect an error with the batch of interaction requests; and in response to detecting the error with the batch of interaction requests:

transmit the error to a client device;

subsequent to transmitting the error, receive a corrected batch of interaction requests from the client device;

determine that the corrected batch of interaction requests resolve the error; and in response to determining that the corrected batch of interaction requests resolves the error, validate the corrected batch of interaction requests.

9. The system of claim 1, wherein the particular validation process is a first validation process, and wherein the memory further comprises instructions that are executable by the processing device for causing the processing device to:

determine that a particular second validation process for a particular interaction request in the set of interaction requests experienced a failure; and in response to determining that the particular second validation process experienced the failure:

cancel the particular second validation process for the particular interaction request; and perform validation processes other than the particular second validation process for a remainder of the set of interaction requests.

10. A method comprising:

receiving, by a processing device, a set of interaction requests from one or more client devices;

prior to performing interactions requested by the set of interaction requests:

selecting, by the processing device, a respective validation process, from among a plurality of predefined validation processes, to apply to each interaction request of the set of interaction requests assigning, by the processing device, validation identification numbers to the interaction requests in the set, wherein a respective validation identification number is assigned to each interaction request of the set based on the respective validation process selected for that interaction request, the respective validation identification number uniquely identifying the respective validation process to be performed for that interaction request, and wherein at least two of the interaction requests in the set are assigned a same validation identification number associated with a same validation process of the plurality of predefined validation processes;

dividing, by the processing device, the interaction requests into a plurality of batches by assigning a respective batch identification number to each interaction request in the set, wherein each interaction request is assigned to a respective batch of the plurality of batches based on the respective validation identification number assigned to the interaction request, such that each batch of the plurality of batches contains interaction requests having a shared validation identification number; and subsequent to dividing the interaction requests into the plurality of batches, automatically validating, by the processing device, all interaction requests in a batch of the plurality of batches substantially contemporaneously using the respective validation process associated with the shared validation identification number corresponding to the batch;

receiving, by the processing device, an interaction request from a client device;

based on receiving the interaction request, assigning, by the processing device, a particular validation process to the interaction request;

after assigning the particular validation process to the interaction request, initiating, by the processing device, the particular validation process on the interaction request;

after initiating the particular validation process on the interaction request, determining, by the processing device, that the interaction request has been pending in an approval queue for longer than a threshold amount of time;

in response to determining that the interaction request has been pending in the approval queue for longer than the threshold amount of time, automatically adjusting, by the processing device, the particular validation process for the interaction request based on one or more characteristics of the interaction request; and executing, by the processing device, the adjusted validation process, wherein the adjusted validation process involves at least one validation step that is different from the particular validation process.

11. The method of claim 10, further comprising:
selecting the respective validation process for each interaction request in the set of interaction requests based on a respective authentication process associated with initiating the interaction request, wherein a more-rigorous validation process is selected when the respective authentication process is less rigorous, and wherein a less-rigorous validation process is selected when the respective authentication process is more rigorous.

12. The method of claim 11, further comprising:
determining that an authentication process associated with a particular interaction request of the set of interaction requests involves multifactor authentication; and
selecting the less-rigorous validation process, from among the plurality of predefined validation processes, to apply to the interaction request based on the authentication process involving multifactor authentication.

13. The method of claim 12, further comprising:
determining that another authentication process associated with another interaction request in the set of interaction requests does not involve multifactor authentication; and
selecting the more-rigorous validation process, from among the plurality of predefined validation processes, to apply to the other interaction request based on the other authentication process not involving multifactor authentication.

14. The method of claim 10, further comprising:
determining a validation process, from among the plurality of predefined validation processes, to apply to a particular interaction request of the set of interaction requests based on characteristics of the particular interaction request, the characteristics comprising a value of the particular interaction request and a geographical location associated with the particular interaction request.

15. The method of claim 10, further comprising:
receiving an adjustment to a configuration file, the adjustment comprising disabling of a validation process for interaction requests associated with a particular batch identification number;
subsequent to the adjustment to the configuration file, receiving another interaction request from a client device;
assigning the particular batch identification number to the other interaction request; and
in response to assigning the particular batch identification number to the other interaction request and based on the adjustment to the configuration file, automatically performing an interaction requested by the other interaction request without performing the same validation process.

16. The method of claim 10, further comprising, subsequent to assigning the respective batch identification number to each interaction request:
determining, based on a configuration file, that the batch of interaction requests was received outside of a predetermined time window;
in response to determining that the batch of interaction requests was received after the predetermined time window, preventing the batch of interaction requests from being automatically validated until the predetermined time window occurs again by holding the batch of interaction requests in a queue; and
adjusting the configuration file to change the predetermined time window.

17. The method of claim 10, further comprising, prior to automatically validating the batch of interaction requests:
detecting an error with the batch of interaction requests; and
in response to detecting the error with the batch of interaction requests:
transmitting the error to a client device;
subsequent to transmitting the error, receiving a corrected batch of interaction requests from the client device;
determining that the corrected batch of interaction requests resolves the error; and
in response to determining that the corrected batch of interaction requests resolves the error, validating the corrected batch of interaction requests.

18. A non-transitory computer-readable medium comprising program code executable by a processing device for causing the processing device to:

receive a set of interaction requests from one or more client devices; and prior to performing interactions requested by the set of interaction requests:

select a respective validation process, from among a plurality of predefined validation processes, to apply to each interaction request of the set of interaction requests;

assign validation identification numbers to the interaction requests in the set, wherein a respective validation identification number is assigned to each interaction request of the set based on the respective validation process selected for that interaction request, the respective validation identification number uniquely identifying the respective validation process to be performed for that interaction request, and wherein at least two of the interaction requests in the set are assigned a same validation identification number associated with a same validation process of the plurality of predefined validation processes;

divide the interaction requests into a plurality of batches by assigning a respective batch identification number to each interaction request in the set, wherein each interaction request is assigned to a respective batch of the plurality of batches based on the respective validation identification number assigned to the interaction request, such that each batch of the plurality of batches contains interaction requests having a shared validation identification number; and subsequent to dividing the interaction requests into the plurality of batches, automatically validate all interaction requests in a batch of the plurality of batches substantially contemporaneously using the respective validation process associated with the shared validation identification number corresponding to the batch;

receive an interaction request from a client device;

based on receiving the interaction request, assign a particular validation process to the interaction request;

after assigning the particular validation process to the interaction request, initiate the particular validation process on the interaction request;

after initiating the particular validation process on the interaction request, determine that the interaction request has been pending in an approval queue for longer than a threshold amount of time;

in response to determining that the interaction request has been pending in the approval queue for longer than the threshold amount of time, automatically adjust the particular validation process for the interaction request based on one or more characteristics of the interaction request; and execute the adjusted validation process, wherein the adjusted validation process involves at least one validation step that is different from the particular validation process.

* * * * *